US011934321B2

(12) United States Patent
Eqbal et al.

(10) Patent No.: US 11,934,321 B2
(45) Date of Patent: Mar. 19, 2024

(54) KERNEL SUPPORT FOR MEMORY PAGING

(71) Applicant: Google LLC, Mountain View, CA (US)

(72) Inventors: Rasha Eqbal, Redwood City, CA (US); Adrian Danis, Sydney (AU); Christopher James Suter, Sydney (AU)

(73) Assignee: GOOGLE LLC, Moutain View, CA (US)

(*) Notice: Subject to any disclaimer, the term of this patent is extended or adjusted under 35 U.S.C. 154(b) by 43 days.

(21) Appl. No.: 17/884,931

(22) Filed: Aug. 10, 2022

(65) Prior Publication Data
US 2024/0054078 A1  Feb. 15, 2024

(51) Int. Cl.
G06F 12/109 (2016.01)
G06F 9/54 (2006.01)
G06F 12/1009 (2016.01)

(52) U.S. Cl.
CPC .......... *G06F 12/109* (2013.01); *G06F 9/545* (2013.01); *G06F 12/1009* (2013.01)

(58) Field of Classification Search
CPC ..... G06F 12/109; G06F 12/1009; G06F 9/545
See application file for complete search history.

(56) References Cited

U.S. PATENT DOCUMENTS

| | | | | |
|---|---|---|---|---|
| 2009/0307438 A1* | 12/2009 | Logan | ............... | G06F 11/073 718/1 |
| 2014/0149634 A1* | 5/2014 | Tosatti | ............... | G06F 9/45558 711/6 |
| 2016/0092674 A1* | 3/2016 | Hughes | ............... | G06F 21/52 726/22 |
| 2019/0179750 A1* | 6/2019 | Moyer | ............... | G06F 3/0619 |
| 2020/0042444 A1* | 2/2020 | Kang | ............... | H04L 67/1097 |

OTHER PUBLICATIONS

Rajharhia, Aditya et al., "Performance and Extension of User Space File Systems", Mar. 22-26, 2010 (Year: 2010).*
Pagano, Francesco et al., "Understanding Fuchsia Security", Aug. 9, 2021 (Year: 2021).*
Narayan, Sumit et al., "User Space Storage System Stack Modules with File Level Control", Jul. 13-16, 2010 (Year: 2010).*

(Continued)

*Primary Examiner* — Edward J Dudek, Jr.
(74) *Attorney, Agent, or Firm* — Botos Churchill IP Law LLP

(57) ABSTRACT

A memory management method is provided, which includes assigning separate virtual addresses to processes in user space, include to a file system configured to read/write to persistent storage. Virtual memory objects (VMOs) are created in user space that are backed by a user space pager service. Such objects including pages representing a file associated with information maintained in persistent storage. A pager manages reading/writing to persistent storage. The pager populates pages for a given VMO using data retrieved from persistent storage. Upon populating the pages, a state of the VMO is set to a clean state. Upon writing to the pages, the state of the VMO is set to a dirty state. Upon initiating writing back to persistent storage, the state of the VMO is set to an awaiting clean state. Upon ending the writing back, the state of the VMO is set to clean.

20 Claims, 9 Drawing Sheets

(56) References Cited

OTHER PUBLICATIONS

Address spaces—Fuchsia, https://fuchsia.dev/fuchsia-src/concepts/memory/address_spaces, retrieved from the internet on Jun. 21, 2022, pp. 1-9.
BlobFS—Fuchsia, https://fuchsia.dev/fuchsia-src/concepts/filesystems/blobfs, retrieved from the internet on Jun. 21, 2022, pp. 1-10.
Filesystem Architecture—Fuchsia, https://fuchsia.dev/fuchsia-src/concepts/filesystems/filesystems, retrieved from the internet Jun. 21, 2022, pp. 1-9.
MinFS—Fuchsia, https://fuchsia.dev/fuchsia-src/concepts/filesystems/minfs, retrieved from the internet on Jun. 21, 2022, pp. 1-10.
Pager—Fuchsia, https://fuchsia.dev/fuchsia-src/reference/kernel_objects/pager, retrieved from the internet on Jun. 21, 2022, pp. 1-2.
Stream—Fuchsia, https://fuchsia.dev/fuchsia-src/reference/kernel_objects/stream, retrieved from the internet Jun. 21, 2022, pp. 1-2.
Virtual Memory Address Region—Fuchsia, https://fuchsia.dev/fuchsia-src/reference/kernel_objects/vm_address_region, retrieved from the internet Jun. 3, 2022, pp. 1-4.
Virtual Memory Object—Fuchsia, https://fuchsia.dev/fuchsia-src/reference/kernel_objects/vm_object, retrieved from the internet Jun. 3, 2022, pp. 1-3.
Pagano, Francesco, et al., "Understanding Fuchsia Security", arXiv:2108.04183v1, Aug. 2021, pp. 1-9.

\* cited by examiner

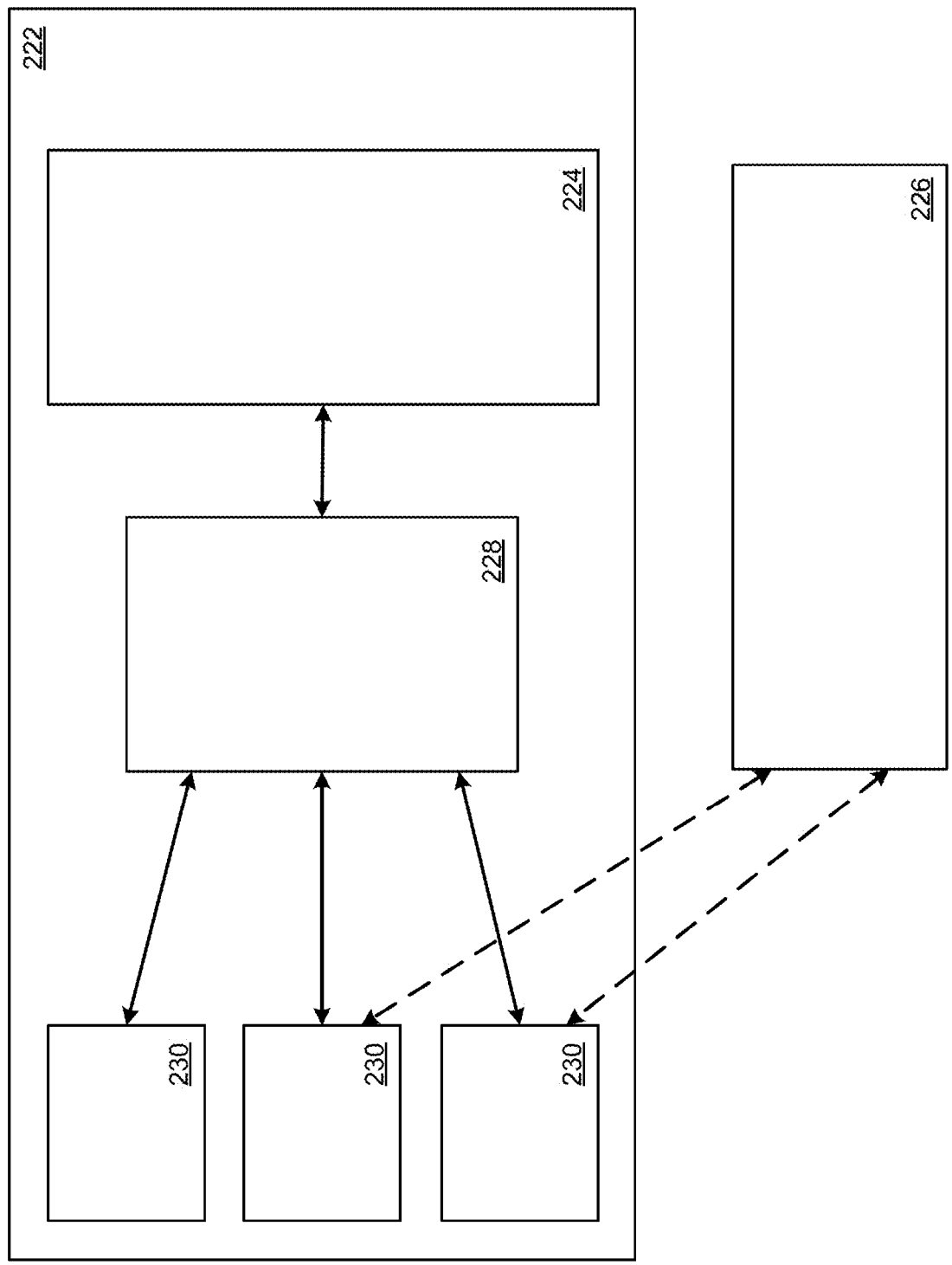

300

400

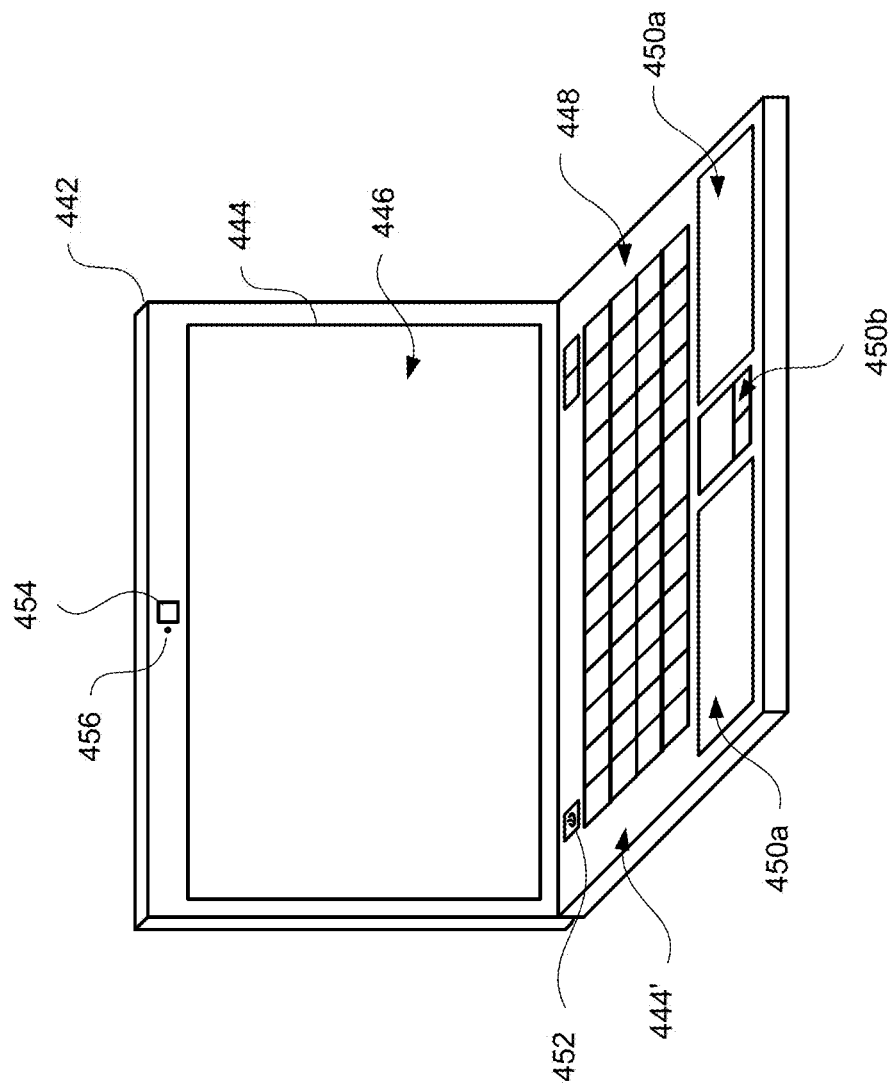

460

500

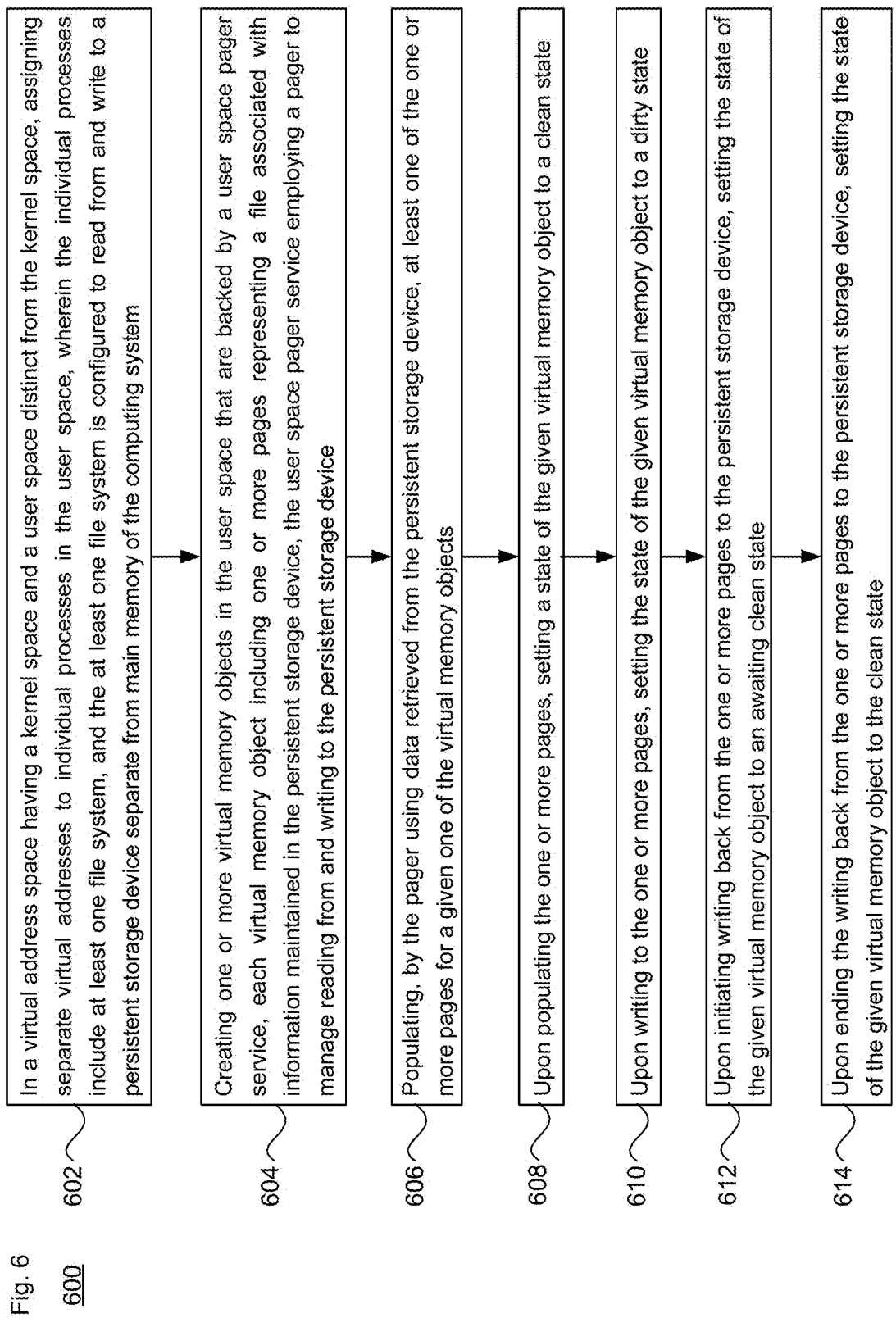

KERNEL SUPPORT FOR MEMORY PAGING

BACKGROUND

Computer systems, whether they be stand-alone devices such as desktop or laptop computers, or larger-scale systems such as cloud-based arrangements that employ one or more groups of servers, execute computer programs within an operating system environment. The operating system is designed to process the program instructions of different programs and manage access to the hardware resources of the computer system. These programs might be native processes running directly on the operating system, or processes inside a guest operating system supported by virtualization in the host operating system. Memory paging can be employed to store data in and retrieve data from a secondary storage device, such as a hard drive (e.g., a disk-type storage system), for use in main memory such as random access memory (RAM). The operating system is able to retrieve data from the secondary storage device in pages that are fixed-size blocks.

An operating system kernel may employ virtual memory objects (VMOs) that are supported by a user space pager service, which can be hosted by a file system associated with the VMO. VMOs may be used in the kernel and user space to represent both paged and physical memory. They can be employed to share memory between processes, as well as between the kernel and user space. Individual files can be represented in memory as VMOs. As the pages of a given VMO are accessed, a pager may read in the pages' contents from the secondary storage device. This approach works well with immutable file systems that handle read-only files. However, writeback support is necessary for mutable file systems where file contents can be modified by clients, and which need to be synchronized back to the hard drive. Without writeback support, mutable file systems cannot take advantage of demand paging, in which pages are loaded only when they are referenced, or mutable memory mapped files where a file's contents can be changed by writing directly to a process's memory.

In some operating systems, memory management, including fault handling and file system logic, may be controlled entirely by the kernel. However, this may require the kernel to have a complete understanding of all aspects associated with memory and file system management, unnecessarily complicating the kernel. File system code can be quite complicated, and including it in the kernel increases the size of the trusted computing base, allowing any vulnerabilities in file system logic to be exploitable to fully compromise the system. This type of kernel-based control may not be desirable or feasible for certain architectures that aim to implement complex functionality, such as file systems, in a constrained user space environment to improve system security. Such kernel-based control may also be undesirable when the operating system architecture supports the use of different types of file systems.

BRIEF SUMMARY

Aspects of the technology involve a communication mechanism between the kernel of an operating system and one or more user space file systems supported by the operating system. The technology supports creating VMOs that are backed by a user space pager service, which can be hosted by the filesystem. An individual file is represented in memory as a VMO. As pages of the VMO are accessed, they are faulted in on demand, with the user pager reading in the pages' contents from disk. Demand paging of files allows more effective use of memory because only the parts of files which are actually used are read into memory, and because physical memory used to back files which haven't been accessed in an extended period can be reclaimed for other purposes. The technology provides writeback support for modified data to be written back to secondary storage. This allows clients of mutable filesystems to directly perform reads and writes on VMOs, instead of relying on channels for data transfer to the file system, which then updates VMO contents that could otherwise cause processing delays.

According to one architecture, file systems are maintained in user space instead of the kernel, so supporting demand paging can involve providing an application programming interface (API) for user paging. This pager API can be configured for moving data between main memory and the secondary storage device. A single pager object may concurrently back multiple paged VMOs, and multiple pagers may exist simultaneously. Each pager may have an associated user space pager service that is responsible for reading/writing to secondary storage. Separate pager objects do not directly interact with each other. As the pager service and its clients access the file contents through the same pager VMO mechanism, both can have a coherent view of the file. The pager API is able to provide the necessary mechanisms for the pager service to efficiently sync its pager VMOs to secondary storage.

By way of example, for supporting writeback, the kernel may block write operations to VMOs that the pager has indicated should follow a "Copy-on-Write" scheme, where each new update to the file is recorded separately on disk instead of overwriting the file contents in place, and proceed once the user pager has acknowledged the write. The kernel can track dirty pages in the VMO and may be configured to surface that information to the pager. The pager can indicate to the kernel when it is syncing a dirty range in a VMO and when it is done, so that the kernel can update the dirty tracking state accordingly. The kernel may also surface information about VMO resizes to the pager. In addition, the user pager may query relevant information that the kernel tracks on its behalf, e.g., when the VMO was last modified.

According to one aspect, a computer-implemented method for memory management of a computing system is provided. The method comprises: in a virtual address space having a kernel space and a user space distinct from the kernel space, assigning separate virtual addresses to individual processes in the user space, wherein the individual processes include at least one file system, and the at least one file system is configured to read from and write to a persistent storage device separate from main memory of the computing system; creating one or more virtual memory objects in the user space that are backed by a user space pager service, each virtual memory object including one or more pages representing a file associated with information maintained in the persistent storage device, the user space pager service employing a pager to manage reading from and writing to the persistent storage device; populating, by the pager using data retrieved from the persistent storage device, at least one of the one or more pages for a given one of the virtual memory objects; upon populating the one or more pages, setting a state of the given virtual memory object to a clean state; upon writing to the one or more pages, setting the state of the given virtual memory object to a dirty state; upon initiating writing back from the one or more pages to the persistent storage device, setting the state of the given virtual memory object to an awaiting clean state; and upon ending the writing back from the one or more pages to the persistent storage device, setting the state of the given virtual memory object to the clean state. The state of the given virtual memory object may be encoded in a page structure of the virtual address space.

The method may further comprise tracking virtual memory objects having pages in the dirty state using a kernel of the computing system. Here, the method may further comprise: querying, by the pager, the kernel for virtual memory objects having pages in the dirty state; and causing, by the pager, writing back from the one or more pages in the dirty state to the persistent storage device. In this case, the method may further include: the pager informing the kernel that the one or more pages in the dirty state have been written back to the persistent storage device; wherein the kernel causes the state to change to the clean state. Alternatively or additionally to any of the above, the method may further comprise tracking virtual memory objects having pages in the awaiting clean state separately from those virtual memory objects having pages in the dirty state.

Alternatively or additionally to any of the above, the method may further comprise the kernel sending a writeback request to the pager, the writeback request indicating to the pager which pages are in the dirty state. Sending the writeback request may comprise sending a plurality of writeback requests for dirty pages in least recently used order. The writeback request may encode a cause for the writeback request in a pager port packet.

Alternatively or additionally to any of the above, all of the virtual memory objects in the user space that are backed by the user space pager service are treated as mutable by default. Alternatively or additionally to any of the above, the method may further comprise detaching the pager from the given virtual memory object. Here, the method may further comprise supporting beginning writeback and ending writeback operations for the given virtual memory object after detaching the pager from the given virtual memory object.

Alternatively or additionally to any of the above, the tracking may include tracking approximate timestamps using a monotonic clock for when each virtual memory object was last modified or accessed. Here, the tracking may include the kernel updating the approximate timestamps only when the kernel is performing a separate task. The tracking may include the kernel recording the approximate timestamp when a write operation completes.

Alternatively or additionally to any of the above, the method may further comprise the at least one file system reserving space in the persistent storage device for new writes each time a write is to occur. Alternatively or additionally to any of the above, the method may further comprise a kernel of the computing system tracking reserving space in the persistent storage device for new writes.

According to another aspect, a computing system comprises main memory and one or more processors operatively coupled to the main memory. The one or more processors are configured to implement a method for memory management using a pager by: in a virtual address space having a kernel space and a user space distinct from the kernel space, assignment of separate virtual addresses to individual processes in the user space, wherein the individual processes include at least one file system, and the at least one file system is configured to read from and write to a persistent storage device separate from main memory of the computing system; creation of one or more virtual memory objects in the user space that are backed by a user space pager service, each virtual memory object including one or more pages representing a file associated with information maintained in the persistent storage device, the user space pager service employing the pager to manage reading from and writing to the persistent storage device; population, by the pager using data retrieved from the persistent storage device, at least one of the one or more pages for a given one of the virtual memory objects; upon population of the one or more pages, set a state of the given virtual memory object to a clean state; upon writing to the one or more pages, set the state of the given virtual memory object to a dirty state; upon initiation of writing back from the one or more pages to the persistent storage device, set the state of the given virtual memory object to an awaiting clean state; and upon ending the writing back from the one or more pages to the persistent storage device, set the state of the given virtual memory object to the clean state.

The one or more processors may be further configured to track virtual memory objects having pages in the dirty state using a kernel of the computing system. Alternatively or additionally, the one or more processors may be further configured to: query, using the pager, the kernel for virtual memory objects having pages in the dirty state; and cause, using the pager, writing back from the one or more pages in the dirty state to the persistent storage device.

BRIEF DESCRIPTION OF THE DRAWINGS

FIGS. 2A-B illustrate block diagrams of memory configurations in accordance with aspects of the technology.

FIGS. 4A-C illustrates example computing devices which can be employed in accordance with aspects of the technology.

FIG. 6 illustrates a method in accordance with aspects of the technology.

DETAILED DESCRIPTION

Overview and General Examples

Figure 1:
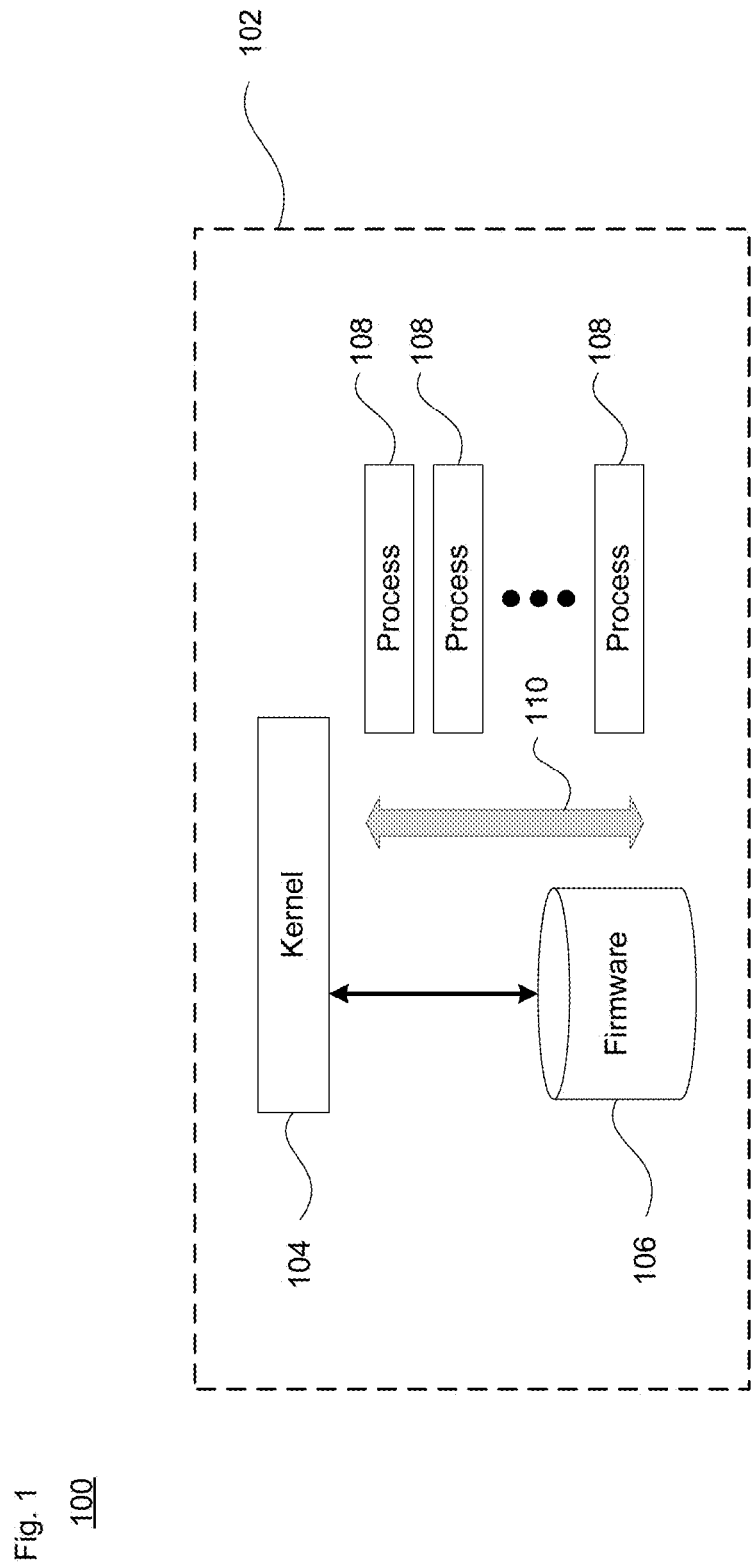
FIG. 1 illustrates a functional diagram of an operating system arrangement in accordance with aspects of the technology.

Aspects of the technology provide efficient memory management, including fault handling, for operating systems that have a microkernel-type architecture. This includes kernel support for pager-backed mutable memory that can be synced or otherwise written back to the pager source, such as a storage disk or other secondary storage. The technology enables file reads and writes through virtual memory mappings. The pager is capable of writing back modified ("dirty") pages in order to reduce the risk of data loss caused by an unexpected shutdown or other issue. Communication between the kernel and filesystem(s) can be minimized, and the kernel is able to support different types of file systems. A single process can work with memory associated with different types of file systems that are independent of one another.

The following are two general examples of memory management and a writeback process according to aspects of the technology.

In the first example, a filesystem client performs a read operation on a file VMO, which does not have any populated content yet, for a given range of the VMO, by a syscall. Since the VMO is pager-backed, the kernel would generate a read request for the associated user pager. The user pager hosted by the filesystem fulfills this request, supplying pages with their contents read from disk (secondary storage). The filesystem client performs write operation on the VMO for the same range. The VMO's pages were populated during read fulfillment, so they can simply be written to via the write operation. At this point the modifications are made only in main memory, but need to be reflected back to the secondary storage (e.g., on the disk) at some point. The user pager queries the kernel for the ranges in the VMO that have been dirtied (modified). This can be done as part of a periodic background flush the filesystem performs, or in response to a flush requested by a filesystem client. The user pager then writes back the queried dirty ranges to the secondary storage. At this point the modified file contents have successfully been persisted to the secondary storage. Once the modified contents have been written back, the user pager informs the kernel that those pages have been cleaned, so that the kernel can start tracking dirty updates if they are modified again.

In the second example, a filesystem client maps a file VMO in its process address space using a mapping operation. The mapping starts at a particular virtual address in the process address space and the client reads a range starting at that address. As above, the kernel would generate a read request for the associated user pager. The user pager hosted by the filesystem fulfills this request, supplying pages with their contents read from disk (secondary storage). In this example, the filesystem client would then write to the same range starting at the particular address. The underlying pages have already been populated, and so the contents are modified in memory. The modifications need to be reflected back on disk in the secondary storage at some point. Next, similar to the first example, the user pager queries the kernel for the ranges in the VMO that have been dirtied (modified). This can be done as part of a periodic background flush the filesystem performs, or in response to a flush requested by a filesystem client. The user pager would then write back the queried dirty ranges to the secondary storage so that the modified file contents have successfully been persisted to the secondary storage. Once the modified contents have been written back, the user pager informs the kernel that those pages have been cleaned, so that the kernel can start tracking dirty updates if they are modified again.

The above examples start off with VMO reads before performing writes. This is done to break up the population of pages by the user pager into a separate step for clarity. Clients can directly write to a file offset not in memory yet. Here, the write will just block until the user pager has supplied the page first.

Both of the examples above assume that the filesystem follows an overwrite model for writes, where populated blocks on disk can be modified in place directly without requesting new disk blocks for the modifications. Modified contents are written back to the same location on disk, so no extra space needs to be allocated for the modifications. However, certain filesystems may use a Copy-on-Write approach, in which every modification is recorded separately and requires new space to be allocated on disk. To accommodate this approach, a mechanism may be employed to reserve space for writes to pages that were already committed. In this case, the filesystem client write operation process can be modified to wait on that reservation before the write can proceed.

The architecture supporting these examples is discussed in detail below.

General Operating System and Memory Arrangements

FIG. 1 illustrates an example 100 of a functional arrangement for a computing device that supports the approaches discussed herein. As shown, operating system 102 may logically include, as shown, a kernel 104, firmware 106 and one or more routines or other processes 108. The kernel 104 may communicate through system calls (syscalls), as shown by arrow 110. Here, the process calls into the kernel, and either gets an immediate response, or waits until the kernel responds to them, both of which occur by returning from the syscall. By way of example, the processes may include user-facing applications, device drivers, file systems, media codecs, network stacks, etc., and may be considered as "clients" of the system.

In contrast to a typical monolithic kernel, a microkernel places a much larger portion of its functionality in user space components. Code running in user space has limited hardware privileges and has limited direct interaction with the kernel 104, which provides enhanced security. For example, the kernel 104 may only handle vital kernel functions like inter-process communication (IPC) and scheduling at the kernel mode, whereas other functions are moved to the user space while in user mode. In comparison, a monolithic kernel would typically have nearly every function, regardless of its level of importance, at the kernel mode and few or none in the user mode.

Figure 2A:
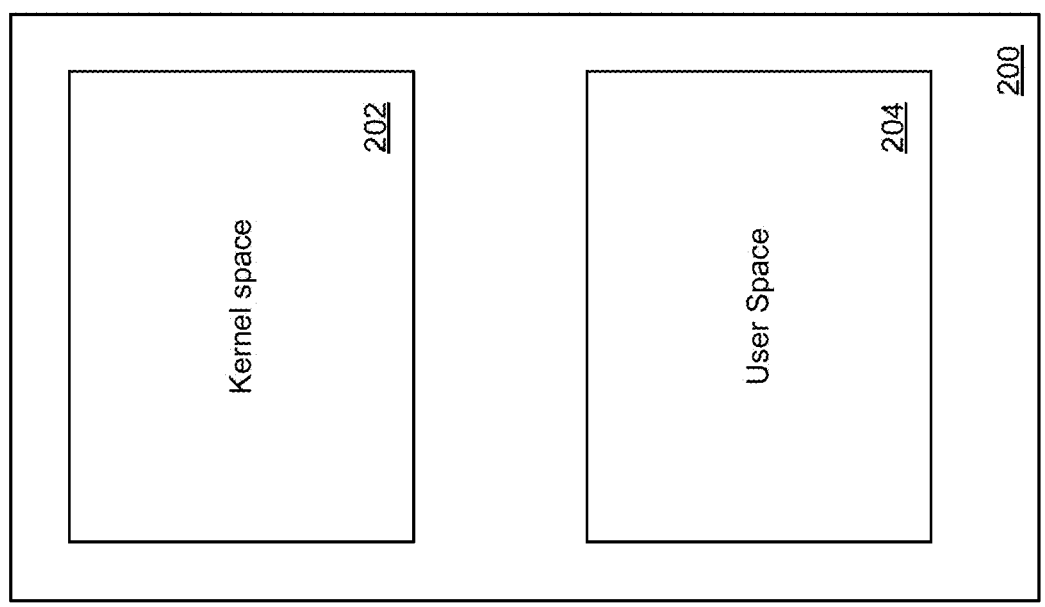

The kernel architecture is configured to provide syscalls to manage processes, threads, virtual memory, inter-process communication, waiting on object state changes, and locking (via futexes). Futexes are objects that enable a caller to wait for a condition to occur at a given memory address. In such aspects, the kernel architecture includes a microkernel, a set of user space drivers, services, and libraries required for the system to communicate with hardware, boot, load user space processes. FIG. 2A illustrates an example of virtual address space 200, showing that kernel space 202 is distinct from user space 204.

FIG. 2B illustrates an example memory arrangement 220 that may be used by the system. The system memory space 222 includes main memory 224, such as RAM of the computing system. The main memory 224 is accessible by certain user space processes (e.g., filesystems and their assisting device drivers), which are able to access a persistent secondary storage device 226, such as a hard drive. The main memory 224 is also in communication with a memory manager 228 of the operating system kernel. Individual processes are assigned their own virtual address space in the user space.

The operating system may use Virtual Memory Address Regions (VMARs) 230 to represent address spaces. Each VMAR has a contiguous range of virtual addresses in the address space associated with the respective process. According to one scenario, each process has a root VMAR, and can partition into a hierarchy of VMARs and mappings. Mappings point to an underlying VMO, and represent "mapped" ranges in the address space, in other words virtual addresses which are backed by physical pages of memory. The VMOs themselves are containers of bytes of memory, holding physical pages that can be mapped into address spaces through the mappings.

In this example, the memory manager 228 may function as a virtual memory manager (VMM) that is responsible for maintaining process address spaces, including: providing pointers to backing physical pages for virtual address ranges that are mapped and ensuring that address ranges have the correct access protection bits set. This is accomplished by managing relationships between the VMARs, the mappings, VMOs, and hardware page tables. The memory manager 228 may also function as a physical memory manager (PMM), which is configured to carve up available physical memory in the main memory 224 into pages and manages what happens to them. The PMM is responsible for providing free physical pages to VMOs when they need them. In one aspect, the kernel may function as the memory manager and the user space processes can be one or more filesystems and related device driver processes. Here, the kernel manages the main memory 224, while the filesystem(s) interacts with the hard drive or other persistent secondary storage device 226.

Pager and VMOO Creation

According to aspects of the technology, filesystem clients can directly interact with the file VMO either through syscalls or through virtual memory (VM) mappings, as noted in the above examples.

Pager-backed VMOs may be associated with a pager port, and a key that will be used in page request packets for that VMO. A pager-backed VMO creation syscall can support an options flag, which indicates that the kernel should trap any writes to the VMO, and can request acknowledgment for the write from the user pager first. This flag can be used for files that operate in Copy-on-Write mode to make reservations for the incoming write.

In one scenario, all pager-backed VMOs may be treated as mutable by default. A benefit to this scenario is that it also works for implementing a read-only filesystem without additional cost. The code paths that modify pages need not be exercised for read-only VMOs. If the VMOs are modified though (e.g., by accidental misuse), but the user pager never queries dirty pages in them and attempts to write them back, then the modified contents will remain in memory only. In one alternative, the user pager can either treat writeback requests for such VMOs as errors, or simply ignore them.

Supplying VMO Pages

Pages in a pager-backed VMO can be populated by the user pager on demand upon receiving a pager read request. In addition, another syscall may be provided that the user pager can use to supply zero pages. This provides an efficient way to supply pages in a pager-backed VMO without having to set up an auxiliary VMO that pages will be spliced out of and into the pager-backed VMO. The user pager can use this option for cases it would have fulfilled with zeros anyway.

Page States for Writeback

Figure 3:
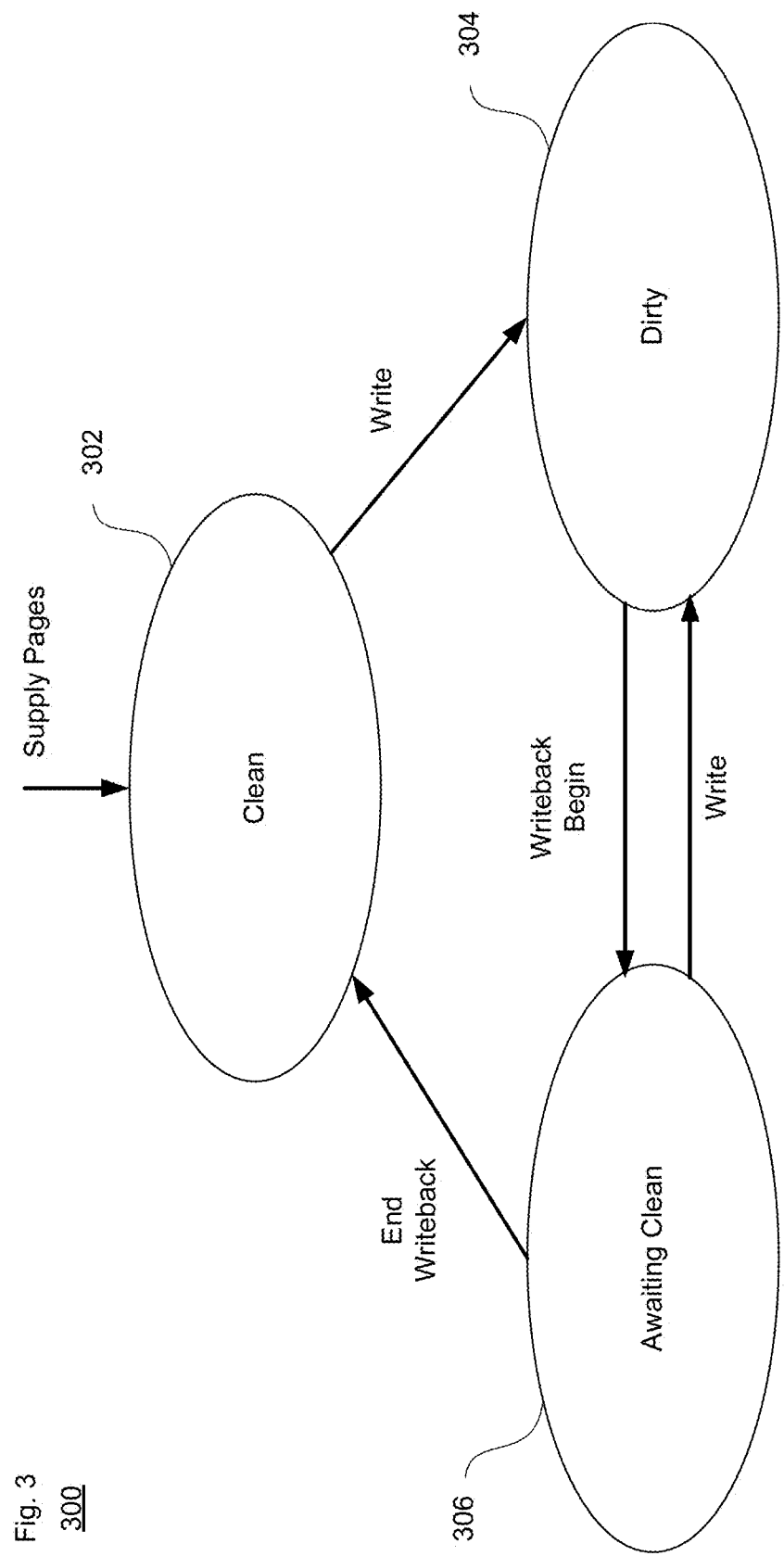
FIG. 3 illustrates a state diagram in accordance with aspects of the technology.

VMOs backed by a pager can have pages in three states: "Clean", "Awaiting Clean" or "Dirty". FIG. 3 illustrates a state diagram 300 with transitions between these states. These states may be encoded in a VM page structure via explicit bits and/or tracked via page queues. Transitions between the three states may follow these steps. First, a page that has been newly supplied will start out in clean state 302. When the page is written to, it will transition to dirty state 304. If the VMO has been created with a "trap dirty" flag, the kernel will block on acknowledgement of a dirty pager request from the user pager first. The user pager can query the kernel for a list of dirty pages in the VMO via a syscall.

For each dirty page that the kernel returns, the user pager can invoke a syscall to signal to the kernel that it is starting to write back the page, which will change its state to awaiting clean 306. If the page is written to beyond this point, its state will switch back to the dirty state 304. The user pager can issue another syscall when it is done writing back the page. If the page state was awaiting clean 306, at this point it will transition to clean 302. However, if the user pager encounters an error while writing back, the page can remain in the awaiting clean state 306. A future query for dirty pages will return both awaiting clean and dirty pages, so that the user pager can attempt to write back the page again.

The awaiting clean state 306 should be tracked as a separate state for a few different reasons. First, even though pages in both clean and awaiting clean states will transition to the dirty state when written to, pages that the user pager is in the process of writing back may preferably be treated differently from clean pages. Clean pages are eligible for reclamation by the kernel when the system is running low on available memory, but pages that are being written back can be protected from being reclaimed.

Second, the kernel can know which version of the page has been written back so it can correctly transition it to the clean state when the pager is done. This is beneficial in order to differentiate page writes that came in before a flush (which will have safely made it back to disk) from ones that came in after (which will need to be written back later). The system could avoid a syscall from the user pager at the start of the writeback, and the kernel could simply mark a page as awaiting clean when it returns the page as part of a dirty pages query to the user pager. However, it may take a certain amount of time before the user pager starts flushing out the page after the query, which leaves a longer window for it to become dirtied again if a write were to occur in between. Having a tighter window bracketing the writeback increases the likelihood that the user pager will be able to successfully move the page to the clean state. In order to update the dirty state, the kernel can track when pages are written both through a syscall and through VM mappings.

Inferring dirty pages during a syscall is straightforward, since the range is specified. The other way a VMO can be accessed is through VI mappings in a process's address space. Writable mappings can start off with the write permission removed in the corresponding page table entries. In this case, a write will generate a protection fault, which can be resolved by restoring the write permission and marking the page state as dirty.

The dirty state referred to here is the state being tracked by software. Dirty bit tracking is supported in hardware page tables on an x86-type architecture. However, it may not be supported on other types of architectures, such as older ARM64 architectures or other platforms that do not support dirty bits in page tables. So in one scenario for consistency and simplicity of implementation, the system may not use the hardware dirty bits to infer a page's dirty or clean state. Relying on hardware page table bits may also pose complications with page table reclamation, which would need to be accounted for when relying on hardware bits. The design outlined here does not preclude using hardware dirty bits though, and support for hardware dirty bits can be implemented in other configurations.

It should be noted that only VMOs directly backed by a pager may qualify for dirty tracking. In other words, Copy-on-Write clones of VMOs backed by a pager may not be opted into dirty tracking, and thus would not see any writeback requests. Pages that are written in clones are forked from the parent's copy of the page, and the clone owns them directly as a distinct page.

Reserving Space for Pending Writes

Writes to VMOs that are tagged to trap writes will require acknowledgement from the user pager before the write can proceed. A solution to this may be implemented in two approaches. The first approach follows a synchronous model, with the filesystem reserving space for new writes each time a write occurs. The second approach utilizes another layer to express dirty reservation quotas in the kernel and how they apply to VMOs, so that the kernel can track reservations itself. This benefits performance by cutting down on the majority of back and forth communication between the kernel and the filesystem.

In the first approach, a flag indicates that the kernel should trap any clean to dirty page transition (or awaiting clean to dirty transition) in the VMO. This approach may work as follows. Passing in the flag sets a trap dirty flag on the VMO at creation time. This flag would be initialized at creation time and remain unchanged for the lifetime of the VMO. When a write comes in on a page not already dirty, the kernel would check to see if the VMO has the trap dirty flag set. If it is not set, the page will be marked dirty and the write will proceed without user pager involvement. This is suitable for non-sparse files being written in an overwrite mode. However, if the VMO has the trap dirty flag set, the kernel can generate a VMO dirty pager request. This is intended for files being written in Copy-on-Write mode, and for sparse files in overwrite mode. For writes via a VM mapping, the request can span the single page containing the faulting address. For stream or VMO writes, the kernel can send a VMO dirty pager request for each contiguous run of non-dirty pages in the range that needs to be written to. This indicates to the filesystem which offsets are requesting space for the write, so that the file system does not have to track exact reserved ranges and only needs to track a reservation count.

The user pager can acknowledge the VMO dirty pager request(s) with a range indicator, which can include one or more offsets and a length to specify the range. Here, the system will set the state for page(s) not already dirty to dirty, and the kernel will proceed with the write. It is possible that pages might be marked dirty when they are not actually dirtied, e.g., if a write fails after the user pager has acknowledged the dirty range(s) when data is being copied from the source buffer. The user pager may specify a larger range than was requested to be dirtied by the pager request, to save on multiple roundtrips for each page, but this comes with a limitation too. All the pages specified by the user pager will be marked dirty, irrespective of whether a write was being attempted on them when the VMO dirty pager request was generated. A write failure condition will not alter the current state of the page, and will only fail the write syscall the write originated in, or generate a fatal page fault exception for VM mappings, or in the case of a stream write that supports partial success, return successfully with a partial write.

Depending on how often the filesystem is flushing dirty data and marking pages clean, the first approach could incur a non-trivial performance cost when pages are written by clients. To avoid this cost, filesystems could delay flushing dirty data for as long as they can. However, in such cases dirty pages may not be evicted and would contribute to memory pressure, and longer intervals between flushes could also increase the likelihood of data loss.

Such performance cost issues can be addressed with the following second approach. In this approach, a particular syscall can be used to specify a certain number of dirty pages associated with a particular pager that the kernel is allowed to accumulate. An expectation here is that the filesystem has reserved space for these many dirty pages beforehand. This can be a per-pager limit, set to zero by default. The limit can be set to a non-zero value, multiple times if required. The first approach essentially operates with this limit set to zero.

The kernel can track the number of dirty pages per pager, incrementing the count on transitions to dirty and decrementing it on transitions to clean. The kernel can still trap every dirty transition as discussed in the other approach, but it will simply increment the number of outstanding dirty pages, if it can do so without exceeding the allotted dirty limit. If the new count does not exceed the limit, the kernel will proceed with the write without involving the user pager.

With this approach, the user pager may communicate two things to the kernel: (i) the pager-wide dirty limit, and (ii) the pages that will count against that limit when they are dirtied. For the latter, the system can employ a trap dirty VMO creation flag. This flag would trigger the generation of a specific type of pager request to query the dirty mode a particular page should operate in. For instance, when the kernel traps writes, it consults the filesystem to figure out whether it should opt in those pages into being counted against the dirty limit. Thus, the sequence of actions on a write to a VMO created with the trap dirty VMO creation flag may be the following.

For a clean page, the kernel would start off not knowing whether it should count the clean to dirty transition against the dirty limit. This can be tracked by a specific dirty mode flag in the VM page structure, which can be initialized to unset by default. The kernel would identify the unset value and generate a VMO dirty mode pager request. For writes through a VM mapping, the request range spans the single page the write falls in. For VMO/stream writes, the request spans the entire range being written. This range might contain pages that are already dirty or whose dirty mode is already known. The kernel can tolerate being given redundant information, so the kernel can optimize for fewer pager requests.

The user pager would respond with a range for one of two operation types: pooled or unpooled. The pooled operation type informs the kernel that pages in the range will count against the per-pager dirty limit. The dirty mode in the VM page can be set to pooled at this point. This can be used for files operating in Copy-on-Write mode, and for sparse regions of files in overwrite mode. The unpooled operation type informs the kernel that pages in the range will not count against the dirty limit. The dirty mode in the VM page table will be set to unpooled at this point. This is suitable for non-sparse regions of sparse files operating in overwrite mode. Both the pooled and unpooled operations will only set the dirty mode on pages that are clean; otherwise, they can be ignored when called against pages that are dirty or awaiting clean.

Once the VMO dirty mode page request has been resolved, the kernel knows how to handle each write to a page in the range. The write can now proceed as follows. Pages with dirty mode set to unpooled can simply be transitioned to dirty without affecting the outstanding pager dirty count. Pages with dirty mode set to pooled can be transitioned to dirty and the outstanding pager dirty count is then incremented, provided it does not exceed the pager dirty limit. If dirtying the page would exceed the pager dirty limit, the kernel can start generating pager VMO dirty packets.

The system may support a writeback end operation that enables optionally passing in the dirty mode via a data argument. In this case, if nothing is specified, the dirty mode would be cleared to unset and future writes will be trapped by the kernel again. Setting the dirty mode at the time of the flush saves the cost of trapping future writes to generate VMO dirty mode pager requests.

This approach allows for a flexible model where the filesystem can mix different types of write modes on its VMOs. Files that are written in Copy-on-Write mode would have their VMOs created with the VMO trap dirty operation, and their pages can use the pooled mode. Similarly, sparse files in overwrite mode can be created with the VMO trap dirty flag, and use the pooled and unpooled modes for sparse and non-sparse regions, respectively. Files that always use overwrite mode can omit the VMO trap dirty flag altogether and they would not incur the cost of pager requests on writes.

If a write would cause the new dirty count to exceed the dirty limit, the kernel is configured to generate a pager VMO dirty request and block the write on its fulfillment. From this point on, every new write on a clean pooled page would generate a pager VMO dirty request, which will need to be acknowledged by the user pager. Essentially this mode is the same as the default mode described above for the first approach. Since the dirty limit for the first approach is set to zero by default, here the system will always operate in an "out-of-quota" mode.

Once the user pager starts receiving pager VMO dirty requests, it is expected to start cleaning pages in order to create space for new dirty pages. The user pager will signal when it is done, e.g., via a set dirty pages limit operation, using the same limit as before or a new one. After this call, the kernel will resume checking the accumulated dirty count against the dirty limit on future writes, and will generate pager VMO dirty requests only when the limit is hit again. The user pager will still resolve any outstanding pager VMO dirty requests.

While the user pager is cleaning pages, the dirty count may fall below the dirty limit again. However, this will not implicitly unblock blocked writes, or stop the generation of pager VMO dirty requests on further writes. That is, once the kernel gets into this state where the limit has been exhausted, according to one aspect the file system will explicitly tell it to transition out of that state, such as via the set dirty pages limit operation.

The two approaches discussed above, differ in the following manner. The primary difference lies with the entity that is responsible for tracking reservation counts. In the first approach, the filesystem is responsible for tracking reservations, and the kernel informs it of when and how much to increase the reservation count by. Since the entity responsible for intercepting potential changes to reservation (the kernel) is not the same as the entity doing the actual bookkeeping (the filesystem), tight coupling is employed between the two. In the second approach, the coupling may be relaxed by having the kernel track the reservation count itself. In this case, communication with the filesystem may only be required when VMO ranges need to be set up to opt in to (or out of) the kernel reservation tracking, and when the kernel runs out of reservation quota and the filesystem needs to intervene.

Since the filesystem will periodically be flushing dirty pages to disk, running out of reservation quota may be considered an edge case scenario. Thus, the majority of the communication would be when VMO ranges need to be set up. The kernel can request information for the same range multiple times (e.g., for writes spanning overlapping ranges), and similarly the filesystem can supply redundant information to the kernel about the same range multiple times. Setting the dirty mode on a page does not actually cost anything against the dirty limit, as the dirty count is only incremented when the page is actually written to. For this reason, the filesystem can also set the dirty mode on pages speculatively to cut down on the performance cost for future pager requests.

The dirty mode information can be attached to the VM page, and so will be lost when a given page is evicted when the system is running low on available memory (e.g., when the amount of available memory is less than 5-25% of total memory, or more or less). Clean pages that have their dirty mode set qualify for page eviction just like any other clean pager-backed page. Since these pages are clean, in which their contents in memory match those on disk, they can be paged back in from the disk when required, so the system can choose to evict them to create more available memory. The kernel can evict these pages without informing the filesystem, as the filesystem does not need to update any reservation counts as a result of the eviction. The dirty count is maintained completely by the kernel, so the filesystem does not need to be involved. When the page is populated again, the kernel will simply request the filesystem again for the dirty mode with a VMO dirty mode pager request.

Losing the dirty mode information when evicting a page is a consequence of tracking the dirty mode in the VM page itself. However, this information can alternatively be tracked elsewhere (e.g., in the VMO's page list that tracks each VMO offset) so that it remains cached when pages are evicted. Another option is to have the kernel cache the last few ranges the filesystem has set up the dirty mode for.

The dirty count update strategy described above increments the count when pages are dirtied and decrements it when they are cleaned. Thus, once N dirty pages have been written to disk, there is an assumption that space can be freed up for an additional N dirty pages. However, the number of outstanding dirty pages may not directly translate to space required on disk. Thus, an alternative may involve a token system, where the filesystem supplies the kernel a certain number of dirty tokens, and each dirty transition (on a pooled page) consumes a token. In this approach, tokens would only be replenished when the filesystem explicitly does so with another call to supply tokens, which would add to the token pool. Tokens would never be implicitly replenished by the kernel itself.

The filesystem may need to reserve disk space for metadata along with space for dirty file contents. Thus, it may be desirable to track metadata reservations in the kernel along with the dirty page count. However, the amount of space required for metadata can vary from filesystem to filesystem, so there may be no global policy that works for all. Therefore, one solution is that the filesystem always ensures there is enough reserved space for metadata, and so it only needs the kernel to track dirty data reservations. To this end, the filesystem might want to set the pager dirty limit to a much lower value than the actual amount of dirty data it can accommodate, to account for the worst case in terms of metadata reservation that might be required.

Discovering Dirty Ranges

The user pager is able to find out about dirty pages in a VMO so it can write them back. There are two different models that may be employed here: a pull model when the user pager queries dirty page information from the kernel, and a push model where the kernel indicates dirty pages by sending the user pager writeback requests.

A specific syscall can be used by the user pager to query dirty ranges within a VMO, which specifies the VMO range to query dirty pages within. An optional pointer of the syscall can return the number of dirty ranges that were written to a buffer. In this case, upon success the optional pointer will contain the number of dirty ranges that were copied out to the buffer. The number of dirty ranges that are copied out to the buffer is constrained by the buffer size. It is possible for there to exist more dirty ranges that could not be accommodated in the buffer. The user pager can call the dirty ranges query multiple times, advancing the offset it is querying until it has processed all dirty pages, and the syscall does not indicate any more available dirty ranges.

The kernel need not make any guarantees about the performance of the dirty pages query. The query can involve walking the VMO's page list to find dirty pages at the very least, and possibly some VM mappings to harvest a number of hardware page table dirty bits in the future. Harvesting the number of dirty bits can require acquiring address space locks, which could have noticeable performance impact on unrelated threads. In this approach, to keep the rest of the system responsive, this syscall may drop locks from time to time to limit the amount of work performed per critical section.

The kernel may also generate writeback pager requests to send dirty information to the user pager if required. For instance, the kernel may send writeback requests for dirty pages (in LRU order) when the system is under memory pressure. The use of writeback pager requests means that the filesystem can discover dirty information via two different methods. In this case, it may be desirable to be able to reconcile these different methods. For example, if a thread is performing flushes with a pager dirty ranges query and another thread is processing pager request packets, it is possible for the filesystem to see duplicate information.

Writeback Pager Requests

With the pull model for a pager dirty range query syscall, the rate of cleaning pages may be entirely dependent on the rate at which the filesystem chooses to query the dirty ranges and attempt writeback. However, there can be a few scenarios where the kernel itself needs to initiate a request to write back pages. For instance, this can include an explicit request from the user to flush a range of pages. The kernel in this case can send a single writeback request for the entire range the flush is being requested on. Or when the system is experiencing memory pressure, so that dirty pages can be cleaned and subsequently freed to relieve the memory pressure. This can serve as a hint to the user pager so it can ramp up the rate at which it is flushing pages, e.g., if it is processing requests in a delayed manner. The kernel can send writeback requests for dirty pages in the least recently used order in this case. Another scenario is when the VMO has been detached from the user pager and all its outstanding dirty pages need to be flushed. The kernel does not initiate writeback requests in this case. Instead, the user pager can use a VMO complete packet to infer that it might need to flush dirty pages.

The cause for the writeback request can be encoded in the pager port packet to differentiate amongst them, so that the user pager can prioritize fulfilling requests accordingly. The actual policy controlling when writeback requests are processed can be controlled by the user pager. The kernel would only try and provide information (e.g., by way of the packet flags) that might aid in this decision. The kernel may try to optimize request generation by generating writeback requests spanning a contiguous run of dirty pages, rather than for a single page. For example, when the kernel is scanning the list of dirty pages under memory pressure, and wants to generate a writeback request for a page, it may try to extend the range beyond the single page in both directions to include other dirty pages too (if there are any) in the same request. This would allow the system to cut down on the number of distinct writeback requests that need to be queued on the pager port.

In some configurations, when the kernel generates writeback requests under memory pressure, the system may employ a policy controlling the number of writeback requests queued on the pager port. In this case, the kernel could track the number of outstanding requests in flight and try to keep them within a certain limit.

In some situations, it can be helpful for the user pager to configure operations that determine (directly or indirectly) the rate of writeback request generation, both under memory pressure, and for background writeback requests. For example, the user pager could specify the recommended length of time a page can be left dirty before queuing a writeback, or the typical data transfer rate the user pager can support for writes. There may be filesystems that need a background writeback rate much higher than the global system default. It may also be beneficial for the user pager to specify the granularity at which it can process requests. The kernel can then take this into account when computing ranges, and might be able to generate fewer requests overall.

Dirty pages can be tracked in a dirty page queue, ordered by when a page is first dirtied. This queue would be used to generate writeback requests under memory pressure, and once pages have been cleaned, they will be moved out of the dirty queue to the (clean) pager backed queues, which currently track and age read-only pages. In an alternative, the system may more finely track ages of dirty pages. For example, it can be helpful to unify dirty and clean pages into a common pool to take advantage of aging and accessed bit tracking with respect to a global working set. This age information may be exposed to the user pager via an API, so that it can be factored in when processing writeback requests.

Writing Back Dirty Ranges

Syscall operations can be used when the user pager is starting to flush the dirty pages and when it is done. For instance, a pager writeback begin operation can change the state of any dirty pages in the specified range to awaiting clean. It will be ignored for any pages already in awaiting clean or clean states, and leave those states unchanged. A pager writeback end operation will change the state of any awaiting clean pages in the specified range to clean. This will be ignored for any pages that are already clean or pages that are dirty, and leave their state unchanged.

If any errors are encountered while performing the flush, such as after a pager writeback begin operation but before a pager writeback end operation, the user pager can handle it in one of two ways. For instance, it can track that the flush has failed and reattempt it later, making sure to call the pager writeback end operation when it is successful. If it does not attempt to track failed ranges itself, it can simply do nothing more. Those pages will remain in awaiting clean state in the kernel, assuming another write does not come through. When the kernel is queried for dirty pages again, it will include awaiting clean pages along with dirty pages, and the user pager will then attempt writeback on those failed pages again.

The above-described architecture does not block new writes that come in while a writeback is in progress, e.g., between writeback begin and writeback end operations. Instead, pages that are written to are simply marked dirty again. In an alternative, the system may block writes on pages when they are in the awaiting clean state. In this case, a writeback sync operation could be implemented as a syscall, which would block writes during writeback.

Resizing the VMO

Resizes on pager-backed VMOs differ fundamentally from anonymous (non pager-backed) VMOs in the way absence of content in the newly resized region is handled. For example, if an anonymous VMO is resized up to a larger size, new content between the old size and new size will be populated as zeros by the kernel upon access. This is because anonymous VMOs have implicit initial content of zero, so uncommitted pages imply zeros. The same is not true for pager-backed VMOs where uncommitted pages do not imply zeros; rather, they simply mean that the pager has not supplied content for those pages yet. On a resize to a larger size however, the pager cannot supply pages in the newly extended range, simply because that content does not exist on the backing source (e.g., a storage disk) yet, and so there is nothing to page in. The kernel can therefore supply pages in this newly extended range as zeros without consulting the user pager.

Resizes may be handled with a zero offset in the VMO that tracks the offset beyond which new content can be implicitly supplied by the kernel as zeros. So in the example of growing to a larger size, the zero offset would be set to the old size, and the kernel would supply zeros for any pages between this offset and the new size. The user pager would not be aware of the range from the zero offset to the new size at this point, so this range will be reported as dirty when the user pager queries for dirty ranges (a syscall to query the new size might be required first). Additionally, the VMO dirty range options would be set to a special flag indicating that this range is all zeros.

If the VMO has been created with a VMO trap dirty flag set, and pages are written to in this newly extended range, the kernel would generate VMO dirty pager requests for them before committing them. This is because the filesystem might need to reserve space for actual (non-zero) pages. This model assumes that zeros can be represented efficiently on disk by the filesystem as sparse regions, so the filesystem is only consulted when pages are committed in the newly extended zero range.

Detaching the VMO from the Pager

A pager detach VMO operation can be used to queue a pager complete packet, which indicates that the user pager should expect no further pager requests for that VMO in the future. This will also indicate that the user pager should query and write back any outstanding dirty pages. Note that the detach will not block until the dirty pages have been written back; it is simply going to inform the user pager that a flush might be needed.

After a detach, any reads and writes to the VMO, either through a syscall or through mappings, will fail if they would have previously required a pager request to be generated. The kernel is free to discard clean pages from the VMO. However, the kernel will hold on to dirty pages until they have been cleaned by the user pager. That is, writeback begin and writeback end operations may continue to be supported on the VMO even after it has been detached. If the pager is destroyed with dirty pages in associated VMOs, the kernel is able to free those pages at that point, regardless of whether there were any outstanding writeback requests. In other words, dirty pages will be held in memory only as long as a pager is around to be able to clean them.

Querying Pager VMO Statistics

The kernel is able to track approximate timestamps using a monotonic clock for when the VMO was last modified and/or accessed, which can be queried by the user pager. These timestamps may be approximate, since tracking them accurately could significantly increase the cost of VMO operations. Instead, they may only be updated when the kernel is already performing a task that is required for functional correctness.

The last modified time would be updated on syscalls that modify the VMO, like VMO write operations and VMO set size operations, and also the first time a write page fault comes through via a mapping. The very first write fault on a page would already be tracked to correctly manage the clean to dirty transition, so the last modified time can be updated then. Future writes that come in via the mapping on a dirty page need not be tracked, because doing that may significantly slow down writing to mapped VMOs. Thus, the last modified time might not be entirely accurate for mapped VMOs. Similarly, the last accessed time might not be accurate either for mapped VMOs. The kernel can update it on syscalls that access pages in the VMO, such as VMO read operations. For mapped VMOs, the last accessed time will be updated during the periodic page scanner run (e.g., every 5-20 seconds, or more or less) when accessed bits are harvested.

One alternative is to track the modified times in the filesystem itself by using pager VMO dirty requests to update the timestamp using a clock of the system (e.g., a UTC-based clock). However, modified times tracked this way might not be precise. The filesystem will acknowledge pager VMO dirty requests before the write has completed, since the kernel needs to wait on this response before proceeding with the write. Thus, the modified times recorded by the filesystem might be slightly off from when the write actually completes in the kernel. Furthermore, there could be errors encountered after the filesystem has responded to the pager request, such as when data is being copied from the source buffer into the file VMO. In this case, the filesystem would have recorded an incorrect modified time when in fact the write did not succeed.

For modified times to be correct, the kernel needs to decide when to record it. There are several approaches that could be employed. A first approach is to have the kernel record the monotonic timestamp when the write completes. The filesystem would later query this and convert it into the clock base and resolution it wants. A second approach is for the kernel to simply record the fact that a write has taken place with a Boolean flag. The filesystem would query this flag (atomically resetting it), and record the timestamp itself at the time of the query. In this approach, timestamps may lag from when writes actually occur. A third approach is to have a filesystem provided clock tied to streams that the kernel uses for timestamps. This is similar to the first approach but it avoids timestamp conversion. A fourth approach is to have the kernel send pager packets to the filesystem to indicate write completion. Here, the kernel could block completion of the write on a response from the filesystem, which is similar to the first approach but it avoids conversion of timestamps from the kernel to the filesystem clock. Alternatively, the kernel could send pager packets lazily after the write has completed, where it does not block completion of the write on a response from the filesystem.

Example Computing Devices

Figure 4A:
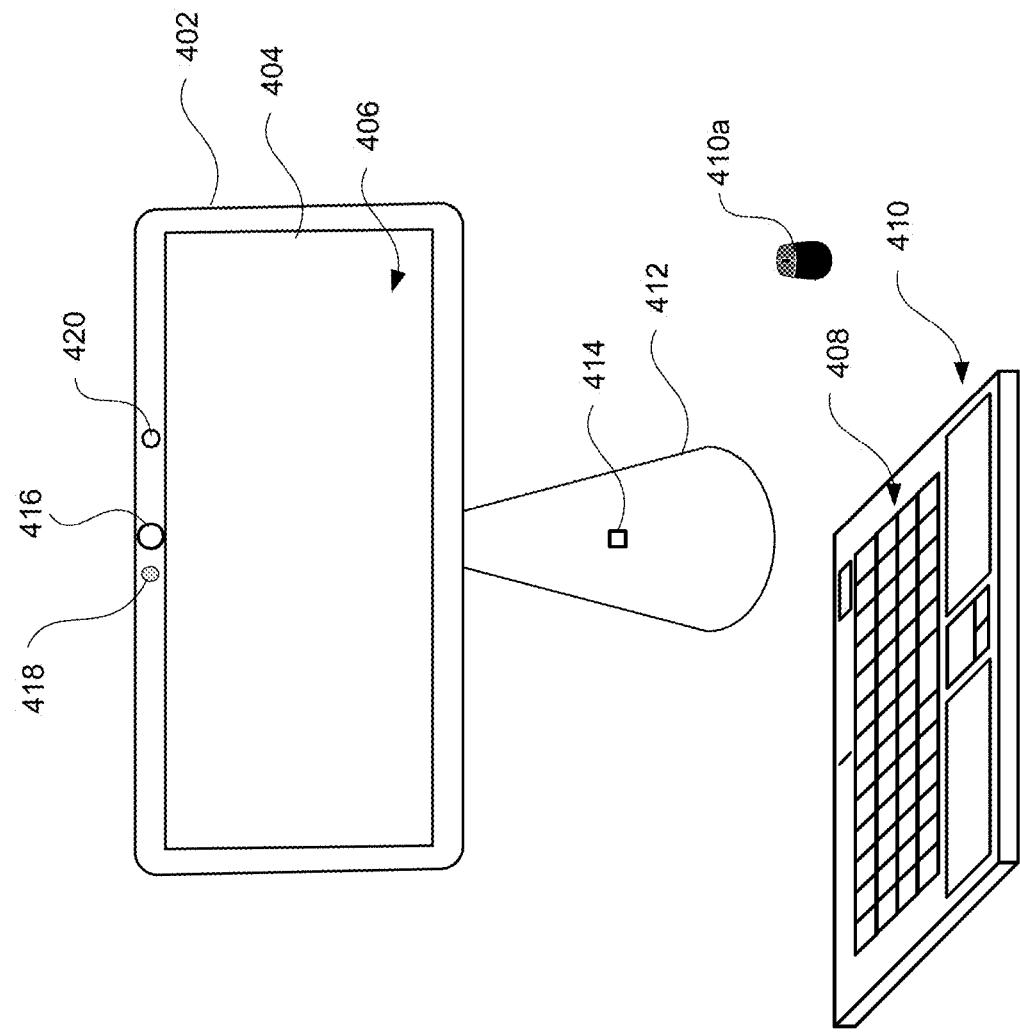

FIG. 4A illustrates a view 400 of an example desktop-type computing device 102, which may use the approaches described above. In this example, a single display 404 is shown, although multiple display devices may be supported. In one scenario, the display 404 may be configured for tactile input using a stylus or touch input with the user's finger(s) to interact with a graphical user interface (GUI) 406 presented on the display. As shown, the computing device 402 may employ a wireless keyboard 408 and/or one or more trackpads or mousepads 410, which may be part of one unit or the keyboard may be separate from the trackpad/mousepad or a mouse-based input 410*a*. Alternatively, the keyboard and/or other user inputs may have a wired connection to the computing device 402. As shown in this example, the computing device has a stand 412. One or more microphones 414 may be disposed along the stand and/or disposed along the housing of the integrated client device 402. While the computing device may be fixedly mounted to the stand 412, in an alternative configuration the screen (with the integrated components) can be detached from the stand, allowing a user to carry around the home and use remotely based on battery power. In other words, the client device can comprise an integrated housing that is (optionally removably or releasably) coupled to the stand 412.

In this example, a webcam or other integrated camera 416 that may include a privacy shutter or other feature to disable image-taking is positioned along the housing of the computing device 402, which can be used for videoconferences, interactive gaming, etc. Indicator 418, such as an LED, may be illuminated to alert a user whenever the webcam 416 is in use. The integrated client device may include a separate camera or other imaging device 420 that is part of a presence sensor. As shown, the webcam 416 and the imaging device 420 may each be positioned along a top bezel of the integrated client device housing. In some examples these devices may be located in different position along the integrated housing. The integrated camera 416 may be used as part of the presence sensor instead of or in addition to imaging device 420. In other words, the presence sensor comprises an image sensor configured to take one or more images. The presence sensor can be configured to detect presence of one or more people within a threshold distance from the client computing device. For example, the presence sensor includes the image sensor, as discussed herein, and the client device is configured to detect the presence of one or more people in imagery (images) taken by the image sensor.

FIG. 4B illustrates view 440 of an example laptop computer 142, such as a netbook. In this example, a display 444 is shown. In one scenario, the display 444 may be configured for tactile input using a stylus or touch input with the user's finger(s) to interact with a graphical user interface (GUI) 446 presented on the display. As shown, the laptop 442 may employ a keyboard 448 and/or one or more trackpads 450a and/or mousepads 450b. These input devices 448 and 450 may be virtual input devices presented on a second display 444'. In this case, the laptop computer 442 may also function as a dual-screen device. One or more microphones 452 may be disposed along the housing of the computer 442. The laptop computer 442 may include a webcam or other integrated camera 454 that may include a privacy shutter or other feature to disable image-taking is positioned along the housing, which can be used for videoconferences, interactive gaming, etc. Indicator 456, such as an LED, may be illuminated to alert a user whenever the webcam 454 is in use. Similar to the computing device 402, the laptop computer 442 may include a separate camera or other imaging device, other than the webcam 454, that is part of a presence sensor.

Figure 4C:
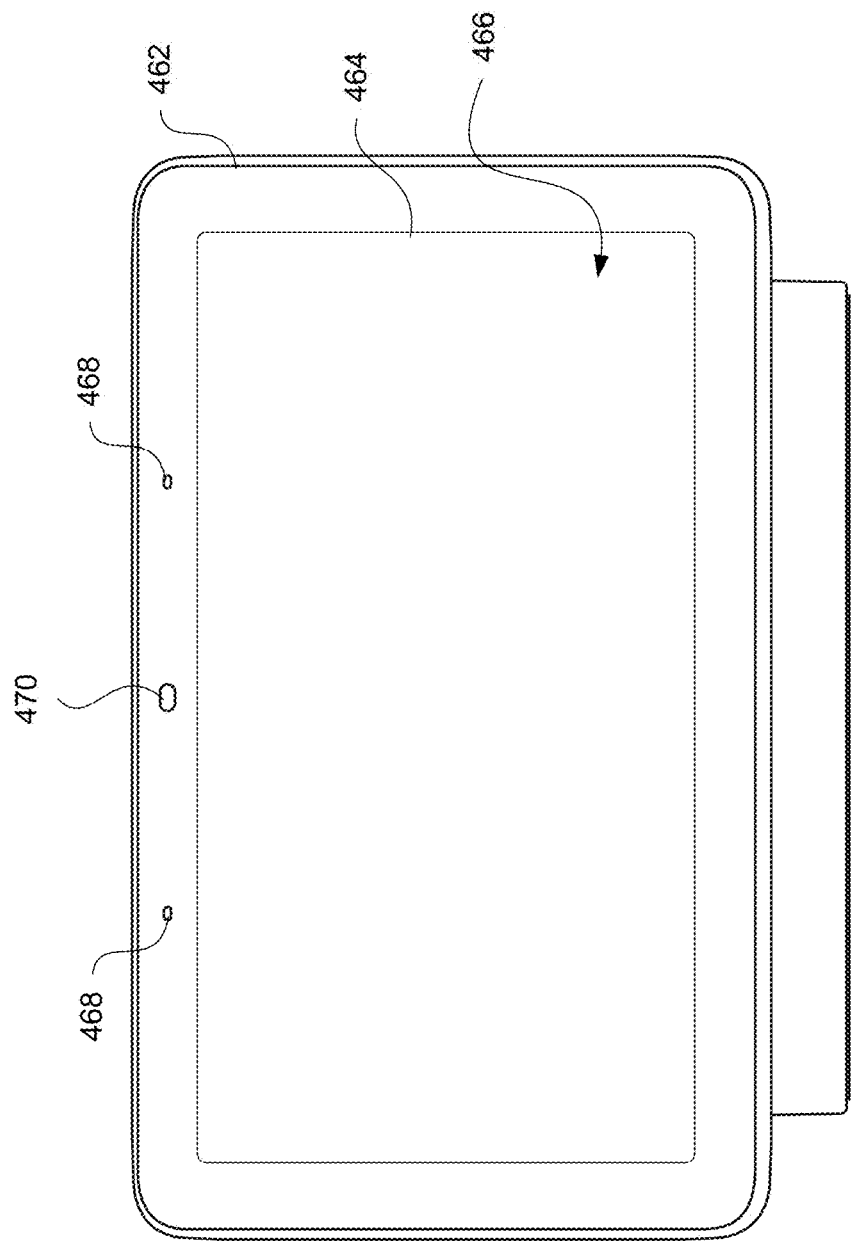

FIG. 4C illustrates view 460 of an example interactive home appliance 462. In this example, a display 464 is shown. In this example, the appliance 462 does not include a keyboard. In one scenario, the display 464 may be configured for tactile input using a stylus or touch input with the user's finger(s) to interact with a graphical user interface (GUI) 446 presented on the display. Alternatively or additionally to this, the interactive home appliance 462 may be configured to detect contactless gesture input, such as using a close range radar sensor (not shown), acoustical sensors (e.g., a microphone array) 468, cameras such as webcam 470, etc. In this arrangement, the camera(s) 470 may be part of a presence sensor.

Figure 5:
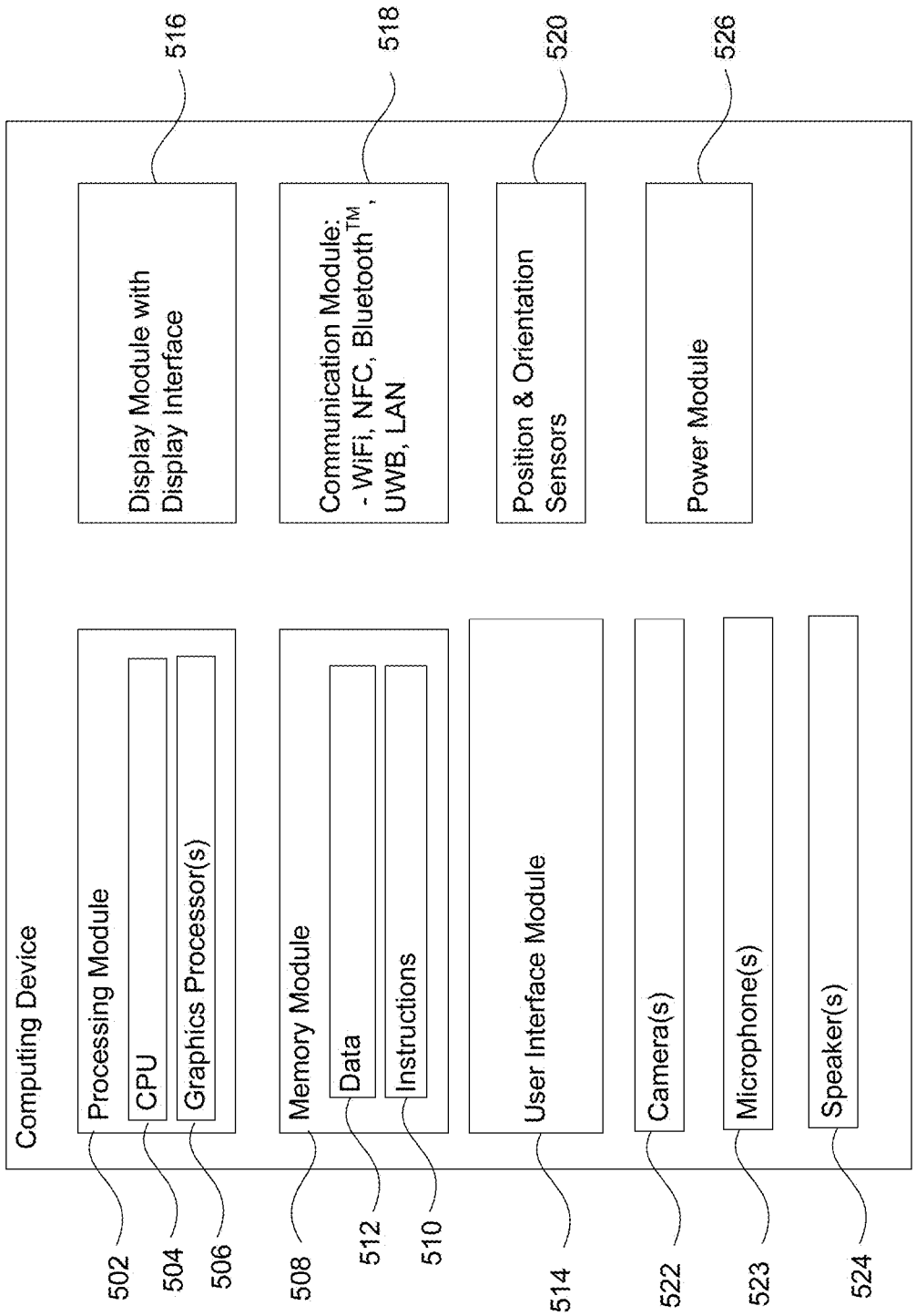
FIG. 5 illustrates a block diagram of an example computing device which can be employed in accordance with aspects of the technology.

FIG. 5 illustrates a block diagram 500 of an example computing device such as a desktop-type device, laptop-type device or interactive home appliance-type device discussed above. Depending on the type of device, certain elements such as various user interface components may be optional or omitted. As shown, the computing device includes a processing module 502 having one or more hardware-based computer processors such as a central processing unit 504 and/or graphics processors 506, as well as memory module 508 configured to store instructions 510 and data 512. The processors may or may not operate in parallel, and may include ASICs, controllers and other types of hardware circuitry. As noted above, a virtualization approach employing virtual CPUs (vCPUs) can be utilized. The processors are configured to receive information from a user through user interface module 514, and to present information to the user on a display device of the display module 516 via the user interface module. The display module 516 has a display interface and may be configured as a touchscreen that enables user input via a stylus or other tool, or by the user physically touching the screen. Alternatively or additionally, contactless gesture input and/or audio input may be supported.

User interface module 514 is configured to receive user input. User interface module 514 may receive commands from a user via user inputs and convert them for submission to a given processor. The user interface module may link to a web browser (not shown). The user inputs may include a touchscreen as noted above, in addition to or alternatively from a keyboard, keypad, mousepad and/or touchpad, microphone, gesture-based input or other types of input devices. The keyboard, keypad, mousepad and/or touchpad may be part of or connectable to the computing device via a cable or other wired connection, or may physically separate from the integrated client device and configured to connect via one or more wireless connections such as Bluetooth™, WiFi, ultra-wideband (UWB), infrared, etc. The user interface module 514 can be operatively connected to the display module 516.

The display module 516 may comprise circuitry for driving the display device to present graphical and other information to the user. In other words, the display device is configured to present visual content. By way of example, the graphical information may be generated by the graphics processor(s) 506, while central processing unit (CPU) 504 manages overall operation of the computing device. The graphical information may display responses to user queries on the display module 516. For instance, the processing module may run a browser application, gaming application, enterprise app or other service using instructions and data stored in memory module 508, and present information associated with such apps or services to the user via the display module 516. The memory module 508 may include a database or other storage for browser information, game state information, location information, etc.

Memory module 508 can be implemented as one or more of a computer-readable medium or media, a volatile memory unit or units, or a non-volatile memory unit or units. The memory module may comprise main memory (e.g., RAM) and secondary storage (e.g., a hard drive), and the stored information may be processed using VMOs in the manner described above. One or more regions of the memory module 208 may be write-capable while other regions may comprise read-only (or otherwise write-protected) memories. In one implementation, a computer program product is tangibly embodied in an information carrier. Although FIG. 5 functionally illustrates the processor(s), memory module, and other elements of integrated client device as being within the same overall block, such components may or may not be stored within the same physical housing. For example, some or all of the instructions and data may be stored on an information carrier that is a removable storage medium connectable to the base or the display housing (e.g., optical drive, high-density tape drive or USB drive) and others stored within a read-only computer chip which is integrated into the base or the display housing.

The data 512 may be retrieved, stored or modified by the processors in accordance with the instructions 510. For instance, the data may be stored in computing device registers, in a relational database as a table having a plurality of different fields and records, XML documents or flat files. The data may also be formatted in any computing device-readable format. The instructions 510 may be any set of instructions to be executed directly (such as machine code) or indirectly (such as scripts) by the processor(s). For example, the instructions may be stored as computing device code on the computing device-readable medium. In that regard, the terms "instructions" and "programs" may be used interchangeably herein. The instructions may be stored in object code format for direct processing by the processor(s), or in any other computing device language including scripts or collections of independent source code modules that are interpreted on demand or compiled in advance.

As also shown in example 500 of FIG. 5, the computing device includes a communication module 518 for communicating with other devices and systems, including other computing devices (e.g., a user's mobile phone or wearable computing device such as a smartwatch or pair of earbuds), servers and databases. The communication module 518 includes a wireless transceiver; alternatively, the module may alternatively or additionally include a wired transceiver. The integrated client device 500 may communicate with other remote devices via the communication module 518 using various configurations and protocols, including short range communication protocols such as near-field communication (NFC), Bluetooth™, Bluetooth™ Low Energy (BLE), UWB or other ad-hoc networks, the Internet, intranets, virtual private networks, wide area networks, local networks, private networks using communication protocols proprietary to one or more companies, Ethernet, WiFi and HTTP, and combinations of the foregoing.

In addition, the example computing device as shown may include one or more position and orientation sensors 520. The position and orientation sensors 520 are configured to determine the position and orientation of one or more parts of the computing device, such as the display module relative to the base. For example, these components may include a GPS receiver to estimate the integrated client device's latitude, longitude and/or altitude, as well as an accelerometer, gyroscope or another direction/speed detection device such as an inertial measurement unit (IMU) capable of determining the orientation of the display housing relative to the base (as well as the rate of change of the positioning of the display housing). The computing device may also include one or more camera(s) 522 for capturing still images and recording video streams such as an integrated webcam and/or a dedicated imaging device for presence sensing as discussed above. The device may also include one or more microphones 523 (which can be used for instruction input and/or presence sensing, e.g., by detecting acoustic information within the threshold distance from the client device), speakers 524, as well as a power module 526. Actuators to provide tactile feedback or other information to the user may be incorporated into the touchscreen of the display module (not shown).

Exemplary Method of Operation

FIG. 6 illustrates a method for implementing aspects of the technology. The method involves memory management of a computing system. At block 602, in a virtual address space having a kernel space and a user space distinct from the kernel space, the method includes assigning separate virtual addresses to individual processes in the user space. The individual processes include at least one file system, and the at least one file system is configured to read from and write to a persistent storage device separate from main memory of the computing system. At block 604 the method includes creating one or more virtual memory objects in the user space that are backed by a user space pager service. Each virtual memory object includes one or more pages representing a file associated with information maintained in the persistent storage device. The user space pager service employs a pager to manage reading from and writing to the persistent storage device. At block 606 the method includes populating, by the pager using data retrieved from the persistent storage device, at least one of the one or more pages for a given one of the virtual memory objects. At block 608 the method includes, upon populating the one or more pages, setting a state of the given virtual memory object to a clean state. At block 610 the method includes, upon writing to the one or more pages, setting the state of the given virtual memory object to a dirty state. At block 612 the method includes, upon initiating writing back from the one or more pages to the persistent storage device, setting the state of the given virtual memory object to an awaiting clean state. And at block 614 the method includes, upon ending the writing back from the one or more pages to the persistent storage device, setting the state of the given virtual memory object to the clean state.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A computer-implemented method for memory management of a computing system, the method comprising:
   in a virtual address space having a kernel space and a user space distinct from the kernel space, assigning separate virtual addresses to individual processes in the user space, wherein the individual processes include at least one file system, and the at least one file system is configured to read from and write to a persistent storage device separate from main memory of the computing system;
   creating one or more virtual memory objects in the user space that are backed by a user space pager service, each virtual memory object including one or more pages representing a file associated with information maintained in the persistent storage device, the user space pager service employing a pager to manage reading from and writing to the persistent storage device;

populating, by the pager using data retrieved from the persistent storage device, at least one of the one or more pages for a given one of the virtual memory objects;

upon populating the one or more pages, setting a state of the given virtual memory object to a clean state;

upon writing to the one or more pages, setting the state of the given virtual memory object to a dirty state;

upon initiating writing back from the one or more pages to the persistent storage device, setting the state of the given virtual memory object to an awaiting clean state; and upon ending the writing back from the one or more pages to the persistent storage device, setting the state of the given virtual memory object to the clean state.

2. The method of claim 1, wherein the state of the given virtual memory object is encoded in a page structure of the virtual address space.

3. The method of claim 1, further comprising tracking virtual memory objects having pages in the dirty state using a kernel of the computing system.

4. The method of claim 3, further comprising:
querying, by the pager, the kernel for virtual memory objects having pages in the dirty state; and
causing, by the pager, writing back from the one or more pages in the dirty state to the persistent storage device.

5. The method of claim 4, further comprising:
the pager informing the kernel that the one or more pages in the dirty state have been written back to the persistent storage device;
wherein the kernel causes the state to change to the clean state.

6. The method of claim 3, further comprising tracking virtual memory objects having pages in the awaiting clean state separately from those virtual memory objects having pages in the dirty state.

7. The method of claim 3, further comprising the kernel sending a writeback request to the pager, the writeback request indicating to the pager which pages are in the dirty state.

8. The method of claim 7, wherein sending the writeback request comprises sending a plurality of writeback requests for dirty pages in least recently used order.

9. The method of claim 7, wherein the writeback request encodes a cause for the writeback request in a pager port packet.

10. The method of claim 1, wherein all of the virtual memory objects in the user space that are backed by the user space pager service are treated as mutable by default.

11. The method of claim 1, further comprising detaching the pager from the given virtual memory object.

12. The method of claim 11, further comprising supporting beginning writeback and ending writeback operations for the given virtual memory object after detaching the pager from the given virtual memory object.

13. The method of claim 3, wherein the tracking includes tracking approximate timestamps using a monotonic clock for when each virtual memory object was last modified or accessed.

14. The method of claim 13, wherein the tracking includes the kernel updating the approximate timestamps only when the kernel is performing a separate task.

15. The method of claim 13, wherein the tracking includes the kernel recording the approximate timestamp when a write operation completes.

16. The method of claim 1, further comprising the at least one file system reserving space in the persistent storage device for new writes each time a write is to occur.

17. The method of claim 1, further comprising a kernel of the computing system tracking reserving space in the persistent storage device for new writes.

18. A computing system comprising:
main memory; and
one or more processors operatively coupled to the main memory, the one or more processors being configured to implement a method for memory management using a pager by:
in a virtual address space having a kernel space and a user space distinct from the kernel space, assignment of separate virtual addresses to individual processes in the user space, wherein the individual processes include at least one file system, and the at least one file system is configured to read from and write to a persistent storage device separate from main memory of the computing system;
creation of one or more virtual memory objects in the user space that are backed by a user space pager service, each virtual memory object including one or more pages representing a file associated with information maintained in the persistent storage device, the user space pager service employing the pager to manage reading from and writing to the persistent storage device;
population, by the pager using data retrieved from the persistent storage device, at least one of the one or more pages for a given one of the virtual memory objects;
upon population of the one or more pages, set a state of the given virtual memory object to a clean state;
upon writing to the one or more pages, set the state of the given virtual memory object to a dirty state;
upon initiation of writing back from the one or more pages to the persistent storage device, set the state of the given virtual memory object to an awaiting clean state; and
upon ending the writing back from the one or more pages to the persistent storage device, set the state of the given virtual memory object to the clean state.

19. The computing system of claim 18, wherein the one or more processors are further configured to track virtual memory objects having pages in the dirty state using a kernel of the computing system.

20. The computing system of claim 18, wherein the one or more processors are further configured to
query, using the pager, the kernel for virtual memory objects having pages in the dirty state; and
cause, using the pager, writing back from the one or more pages in the dirty state to the persistent storage device.

* * * * *